United States Patent
Hsieh

(10) Patent No.: US 12,237,933 B2
(45) Date of Patent: Feb. 25, 2025

(54) METHOD AND NON-TRANSITORY COMPUTER-READABLE STORAGE MEDIUM AND APPARATUS FOR RETRANSMITTING WIRELESS PEER PACKET

(71) Applicant: Airoha Technology Corp., Hsinchu (TW)

(72) Inventor: Ming-Yi Hsieh, Hsinchu (TW)

(73) Assignee: AIROHA TECHNOLOGY CORP., Hsinchu (TW)

( * ) Notice: Subject to any disclaimer, the term of this patent is extended or adjusted under 35 U.S.C. 154(b) by 180 days.

(21) Appl. No.: 17/567,393

(22) Filed: Jan. 3, 2022

(65) Prior Publication Data
US 2022/0239413 A1    Jul. 28, 2022

Related U.S. Application Data

(60) Provisional application No. 63/140,474, filed on Jan. 22, 2021.

(30) Foreign Application Priority Data

Aug. 12, 2021  (CN) .......................... 202110926383.5

(51) Int. Cl.
*H04L 1/1867* (2023.01)
*H04L 1/08* (2006.01)
(Continued)

(52) U.S. Cl.
CPC ............... *H04L 1/189* (2013.01); *H04L 1/08* (2013.01); *H04L 1/1607* (2013.01);
(Continued)

(58) Field of Classification Search
CPC ... H04L 1/189; H04L 1/08; H04L 1/18; H04L 1/1607; H04L 1/1887; H04W 4/80;
(Continued)

(56) References Cited

U.S. PATENT DOCUMENTS 10,425,737 B2   9/2019 Hsieh
10,880,045 B2   12/2020 Goyal et al.
(Continued)

FOREIGN PATENT DOCUMENTS

| CN | 111464988 A | 7/2020 |
| TW | I668972 B | 8/2019 |
| WO | WO 2021/190430 A1 | 9/2021 |

OTHER PUBLICATIONS

English Translation of Taiwanese Search Report from TIPO issued in Application No. 110129776, dated Dec. 3, 2021.

*Primary Examiner* — Peter Chen
(74) *Attorney, Agent, or Firm* — Birch, Stewart, Kolasch & Birch, LLP

(57) ABSTRACT

The invention relates to methods, non-transitory computer-readable storage medium, and apparatus for retransmitting wireless peer packets. A method for retransmitting wireless peer packets, which is performed by a processing unit of a first wireless slave device, includes: receiving a media packet that is originally sent by a wireless master device to a second wireless slave device in a peer-side time period; and transmitting the media packet in a medium in the peer-side time period when a retransmission mechanism is activated between the wireless master device and the second wireless slave device for retransmitting the media packet. The first wireless slave device and the second wireless slave device are mutually peer devices. The peer-side time period indicates a time period that is originally used by the second wireless slave device communicating with the wireless master device.

20 Claims, 11 Drawing Sheets

(51) Int. Cl.
  *H04L 1/1607* (2023.01)
  *H04R 1/10* (2006.01)
  *H04R 5/033* (2006.01)
  *H04R 5/04* (2006.01)
  *H04S 3/00* (2006.01)
  *H04W 4/80* (2018.01)
  *H04W 84/20* (2009.01)

(52) U.S. Cl.
  CPC ........... *H04R 1/1016* (2013.01); *H04R 5/033* (2013.01); *H04R 5/04* (2013.01); *H04S 3/008* (2013.01); *H04W 4/80* (2018.02); *H04R 2420/07* (2013.01); *H04S 2400/01* (2013.01); *H04W 84/20* (2013.01)

(58) Field of Classification Search
  CPC ....... H04W 4/70; H04W 84/18; H04W 84/80; H04W 28/04; H04R 1/1016; H04R 5/033; H04R 5/04; H04R 2420/07; H04R 25/552; H04S 3/008; H04S 2400/01; H04S 1/007
  See application file for complete search history.

(56) References Cited

U.S. PATENT DOCUMENTS

| | | | | |
|---|---|---|---|---|
| 2011/0310741 | A1* | 12/2011 | Ko | H04W 72/1215 370/235 |
| 2021/0028843 | A1* | 1/2021 | Zhou | H04B 7/063 |
| 2021/0288764 | A1* | 9/2021 | Linsky | H04L 65/611 |
| 2022/0303744 | A1* | 9/2022 | Xie | H04W 88/04 |

* cited by examiner

METHOD AND NON-TRANSITORY COMPUTER-READABLE STORAGE MEDIUM AND APPARATUS FOR RETRANSMITTING WIRELESS PEER PACKET

CROSS-REFERENCE TO RELATED APPLICATIONS

This application claims the benefit of priority to U.S. Provisional Application Ser. No. 63/140,474, filed on Jan. 22, 2021; and Patent Application No. 202110926383.5, filed in China on Aug. 12, 2021; the entirety of which is incorporated herein by reference for all purposes.

BACKGROUND

The disclosure generally relates to wireless transmission and, more particularly, to methods, non-transitory computer readable storage media and apparatuses for retransmitting wireless peer packets.

Wireless earbuds use Bluetooth connectivity to receive speech signal by radio waves from source devices, such as mobile phones, etc. Due to environmental interference, packets transmitted from the source device to the wireless earbuds may be lost. Therefore, it is desirable to have methods, non-transitory computer readable storage media and apparatuses for retransmitting wireless peer packets to address the aforementioned problems.

SUMMARY

The disclosure relates to an embodiment of a method for retransmitting wireless peer packets, which is performed by a processing unit of a first wireless slave device, to include: receiving a media packet that is originally sent by a wireless master device to a second wireless slave device in a peer-side time period; and transmitting the media packet in a medium in the peer-side time period when a retransmission mechanism is activated between the wireless master device and the second wireless slave device for retransmitting the media packet. The first wireless slave device and the second wireless slave device are mutually peer devices.

The disclosure further relates to an embodiment of a non-transitory computer-readable storage medium for retransmitting wireless peer packets when loaded and executed by a processing unit of a first wireless slave device. The non-transitory computer-readable storage medium includes program code to: receive a media packet that is originally sent by a wireless master device to a second wireless slave device in a peer-side time period; and transmit the media packet in a medium in the peer-side time period when a retransmission mechanism is activated between the wireless master device and the second wireless slave device for retransmitting the media packet.

The disclosure further relates to an embodiment of an apparatus for retransmitting wireless peer packets, installed in a first wireless slave device, to include a processing unit. The processing unit is arranged operably to: receive a media packet that is originally sent by a wireless master device to a second wireless slave device through a radio frequency module in a peer-side time period; and transmit the media packet in a medium through the radio frequency module in the peer-side time period when a retransmission mechanism is activated between the wireless master device and the second wireless slave device for retransmitting the media packet.

The first wireless slave device and the second wireless slave device are mutually peer devices. The peer-side time period indicates a time period that is originally used by the second wireless slave device communicating with the wireless master device.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words described the relationship between elements should be interpreted in a like fashion (e.g., "between" versus "directly between," "adjacent" versus "directly adjacent." etc.)

Figure 1:
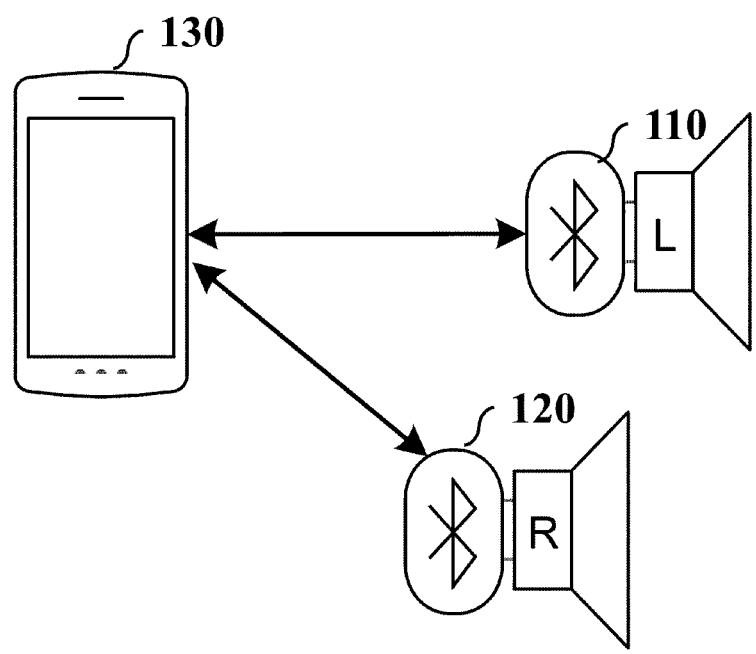
FIG. 1 is a schematic diagram of wireless communications according to an embodiment of the invention.

Refer to FIG. 1. In a scenario, an user acquires data from the mobile phone 130 through wireless earbuds. The wireless earbuds are a pair of apparatuses with wireless communications capabilities, including a left wireless earbud 110 and a right wireless earbud 120, and no physical wire line is connected between the left wireless earbud 110 and the right wireless earbud 120. It may use a wireless communications protocol, such as Bluetooth low energy Audio (LE Audio), extended Synchronous Connection-Oriented (eSCO), Asynchronous Connection-Less (ACL), etc., to transfer packets carrying audio signals between the mobile phone 130 and the left wireless earbud 110 and between the mobile phone 130 and the right wireless earbud 120. In some embodiments, the left wireless earbud 110 and the right wireless earbud 120 may receive media packets including left channel and right channel of stereo data, respectively. In alternative embodiments, the left wireless earbud 110 and the right wireless earbud 120 may receive media packets including mono data.

Figure 2:
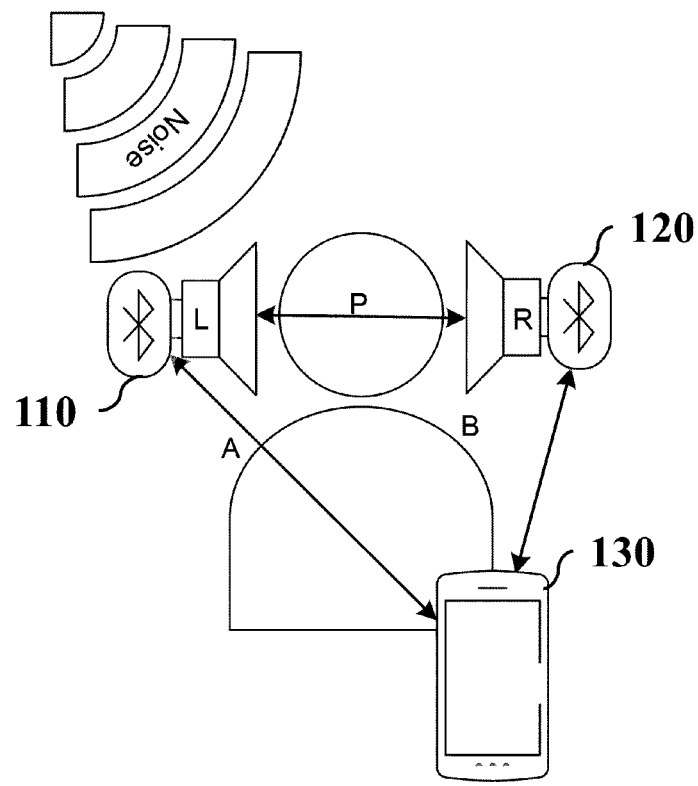
FIG. 2 is a schematic diagram of the left wireless earbud being interfered.

The mobile phone 130, the left wireless earbud 110 and the right wireless earbud 120 may form a Bluetooth wireless transmission network, and the left wireless earbud 110 and the right wireless earbud 120 are mutually peer devices. In wireless transmission, factors such as path loss, antenna field, noise, etc. may affect the success rate of the left wireless earbud 110 or the right wireless earbud 120 in receiving packets from the mobile phone 130. For example, refer to FIG. 2. Since the left wireless earbud 110 is closer to the noise source than the right wireless earbud 120, the path A on which the data transmitted by the mobile phone 130 to the left wireless earbud 110 is severely interfered, and the left wireless earbud 110 cannot successfully receive the packets carrying left-channel data from the mobile phone 130. When the noise continues to be generated, even if the retransmission mechanism is activated between the left wireless earbud 110 and the mobile phone 130, it cannot be overcome. But, because the right wireless earbud 120 is far away from the noise source, the path B on which the data transmitted by the mobile phone 130 to the right wireless earbud 120 is less disturbed than the path A, and the right wireless earbud 120 can successfully receive the packets carrying right-channel data from the mobile phone 130.

To address the aforementioned problems, an embodiment of the invention introduces a mechanism for retransmitting wireless peer packets, allowing the left wireless earbud 110 or the right wireless earbud 120 to continuously receive and temporarily store one or more media packets that are originally sent to the peer device during a peer-side time period. When a retransmission mechanism is activated between the mobile phone 130 and the peer device, the left wireless earbud 110 or the right wireless earbud 120 converts the temporarily stored media packet(s) into radio frequency (RF) signal and emits the RF signal to the medium, such as air or human body, etc. during the peer-side time period, which allows the peer device to successfully receive the retransmitted media packet(s). For example, refer to FIG. 2, when detecting the retransmission mechanism is activated between the mobile phone 130 and the left wireless earbud 110, the right wireless earbud 120 converts the temporarily stored media packet(s) that is originally sent to the left wireless earbud 110 into RF signal, and emits the RF signal to the media during the peer-side time period. Therefore, the left wireless earbud 110 may successfully receive the retransmitted media packet(s) carrying the left-channel data through the path P that is less interfered. Or, the RF signal transmitted by the right wireless earbud 120 and the RF signal transmitted by the mobile phone 130 are superimposed in the medium, so that the left wireless earbud 110 may successfully obtain the retransmitted packet(s) including the left-channel data from the enhanced RF signal. The retransmission of media packet(s) performed in the peer-side time period as described above may be referred to as an overlapped relay. The peer-side time period indicates the time period originally used for the mobile phone 130 to communicate with the peer device.

In some embodiments, the peer-side time period may include slots that are originally used by the mobile phone 130 to transmit or retransmit media packet(s). In alternative embodiments, the peer-side time period may include slots that are originally used by the mobile phone 130 to transmit or retransmit media packet(s) to the peer device, and slots that are originally used by the peer device to transmit response packet(s) to the mobile phone 130. The following paragraphs will explain in more detail the contents and functions of media packets and response packets, as well as examples of peer-side time periods.

Figure 3:
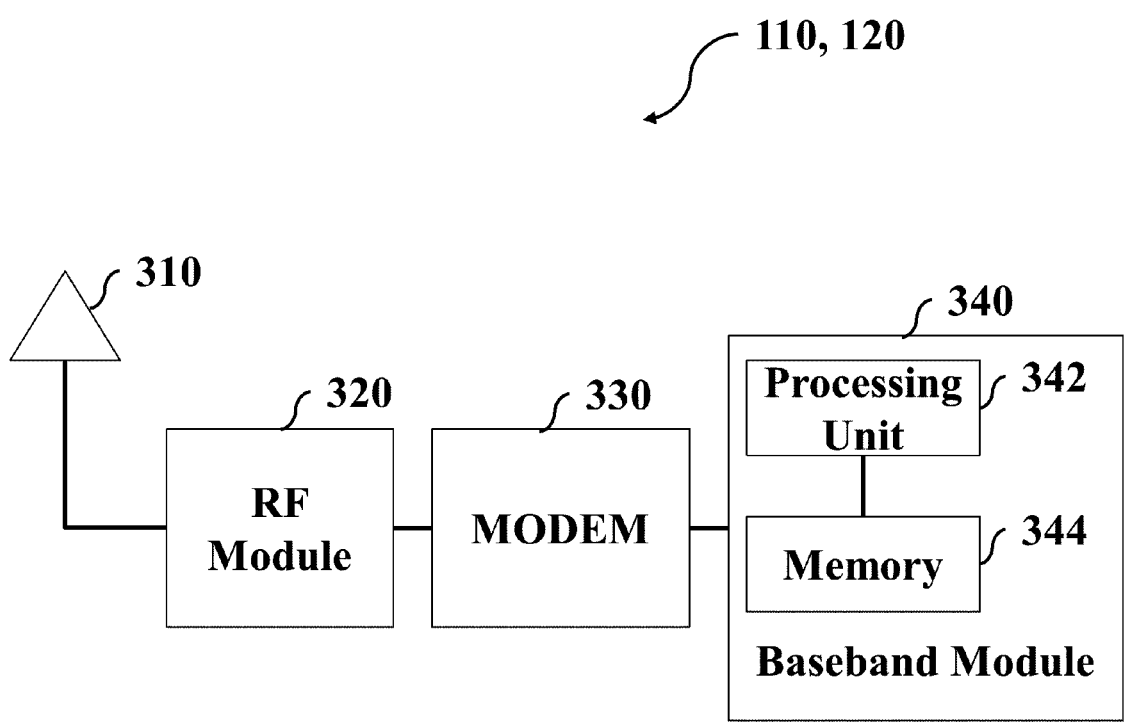
FIG. 3 is the system architecture installed in the left wireless earbud and the right wireless earbud according to an embodiment of the invention.

Refer to FIG. 3 showing the system architecture. The system architecture may be implemented in the left wireless earbud 110 and the right wireless earbud 120, and each includes the antenna 310, the RF module 320, the modulator-demodulator (modem) 330 and the baseband module 340. The baseband module 340 includes the processing unit 342 and the memory 344. The processing unit 342 may be implemented in numerous ways, such as with general-purpose hardware (e.g., a microcontroller unit, a digital signal processor, a single processor, multiple processors or graphics processing units capable of parallel computations, or others) that is programmed using firmware and/or software instructions to perform the functions recited herein. The memory 344 may allocate space as a data buffer temporarily storing the media packet(s) that has been obtained from the medium, which are originally transmitted to the peer device, and to this device for playing. The memory 344 further stores data needed during execution, such as variables, data tables, and so on. The processing unit 342 may couple the memory 344 to access data through a bus architecture.

In adaptive frequency hopping (AFH), the mobile phone 130 may send the same channel map or different channel maps to the left wireless earbud 110 and the right wireless earbud 120. The channel map instructs the left wireless earbud 110 or the right wireless earbud 120 to use the specified one of the multiple physical channels (for example, 37) in the 2.4 to 2.48 GHz frequency band in each time interval (or time slot) to receive data or transmit data, thereby enabling the corresponding RF module 320 to receive or transmit data in each time interval on the designated physical channel. The RF module 320 is employed to receive RF signal in the medium and convert the received RF signal into baseband signal that can be processed by the MODEM 330. The RF module 320 is also employed to receive baseband signal from the MODEM 330 and convert the received baseband signal into RF signal that can be sent to the mobile phone 130. The RF module 320 may include a mixer to generate a new frequency according to the input signal, and the signal output from a local oscillator. The MODEM 330 may implement Gaussian Frequency Shift Keying (GFSK), π/4-Differential Quadrature Phase Shift Keying (DQPSK), 8-Differential Phase Shift Keying (DPSK), or others.

In some embodiments of LE audio, the mobile phone 130 may establish different connection-oriented isochronous channels with the left wireless earbud 110 and the right wireless earbud 120, respectively, and each channel uses the LE Connected Isochronous Stream (LE-CIS) logical transport and supports bi-directional communication.

The two CISs form a connected isochronous group (CIG) and each CIS has multiple CIS instances. The CIS instances in the same CIG have common timing reference data, which is used in the synchronization of isochronous data processing by the left wireless earbud 110 and the right wireless earbud 120. Only one wireless receiver with unique access address is presented in each CIS, and the wireless receiver uses the designated channel map to receive media packets. Within the CIG, and for each CIS, there exists a schedule of transmission and reception time slots referred to as events and subevents.

Each event occurs with a regular interval, called the ISO interval, which may be set in the range from 5 ms to 4 s in multiple of 1.25 ms. Each event is divided into one or more subevents. Each subevent contains a transmission (TX) slot and a reception (RX) slot. Taking the mobile phone 130 as an example, during each subevent in a CIS, the mobile phone 130 may transmit a media packet to the left wireless earbud 110 or the right wireless earbud 120 in a TX slot and the left wireless earbud 110 or the right wireless earbud 120 may reply with a response packet to the mobile phone 130 in a RX slot. The media packet may indicate a packet including a link layer data protocol data unit (LL data PDU) for carrying left-channel or right-channel data. The response packet may be an empty packet including information of acknowledgement (ACK) or negative-acknowledgement (NAK).

When receiving a NAK from the left wireless earbud 110 or the right wireless earbud 120, the mobile phone 130 may retransmit the corresponding media packet. For example, in a subevent, when the mobile phone 130 finds that the next expected sequence number (NESN) in the response packet is equal to the sequence number (SN) in the media packet that has been sent to a receiver, it means that the response packet includes a NAK. The mobile phone 130 retransmits the media packet in the next subevent. Otherwise, it means that the response packet includes an ACK, and the media packet does not need to be retransmitted.

The mobile phone 130 may arrange the media packet transmission between the mobile phone 130 and the left wireless earbud 110 and send the transmission schedule information to the left wireless earbud 110, thereby enabling the left wireless earbud 110 to receive packets in some given time slots (also called RX slots or reception time intervals) and transmit packets in other given time slots (also called TX slots or transmission time intervals). The remains that are not allocated for transmitting or receiving packets are called idle slots. Similarly, the mobile phone 130 may arrange the media packet transmission between the mobile phone 130 and the right wireless earbud 120 and send the transmission schedule information to the right wireless earbud 120.

Figure 4:
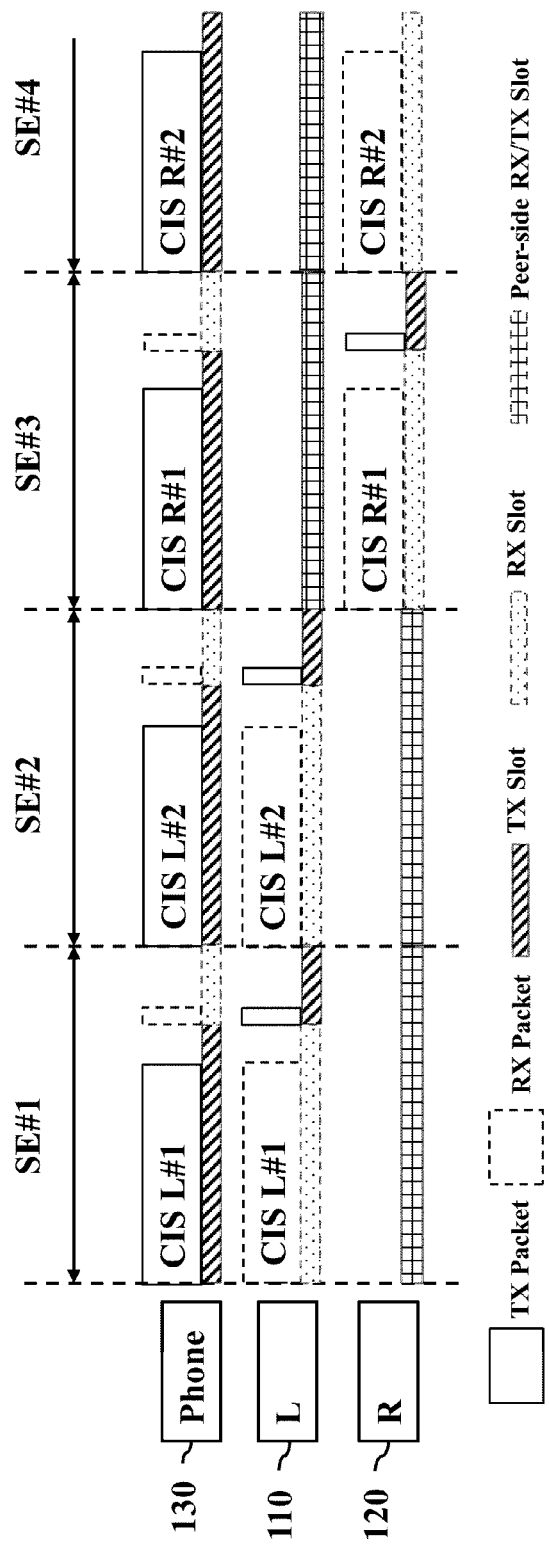
FIG. 4 shows a wireless transmission timing diagram of the Low Energy Connected Isochronous Stream (LE-CIS) according to some implementations.

For example, refer to FIG. 4, in an exemplary transmission between the mobile phone 130 and the left wireless earbud 110, the mobile phone 130 transmits CIS left-channel data L #1 and L #2 to the left wireless earbud 110 in the subevents SE #1 and SE #2. But for the right wireless earbud 120, the times slots in the subevents SE #1 and SE #2 are IDLE slots, which may also be referred to as peer-side transmission/reception (RX/TX) slots. In an exemplary transmission schedule between the mobile phone 130 and the right wireless earbud 120, the mobile phone 130 transmits CIS right-channel data R #1 and R #2 to the right wireless earbud 120 in the subevents SE #3 and SE #4. But for the left wireless earbud 110, the times slots in the subevents SE #3 and SE #4 are IDLE slots, which may also be referred to as peer-side RX/TX slots.

Figure 5:
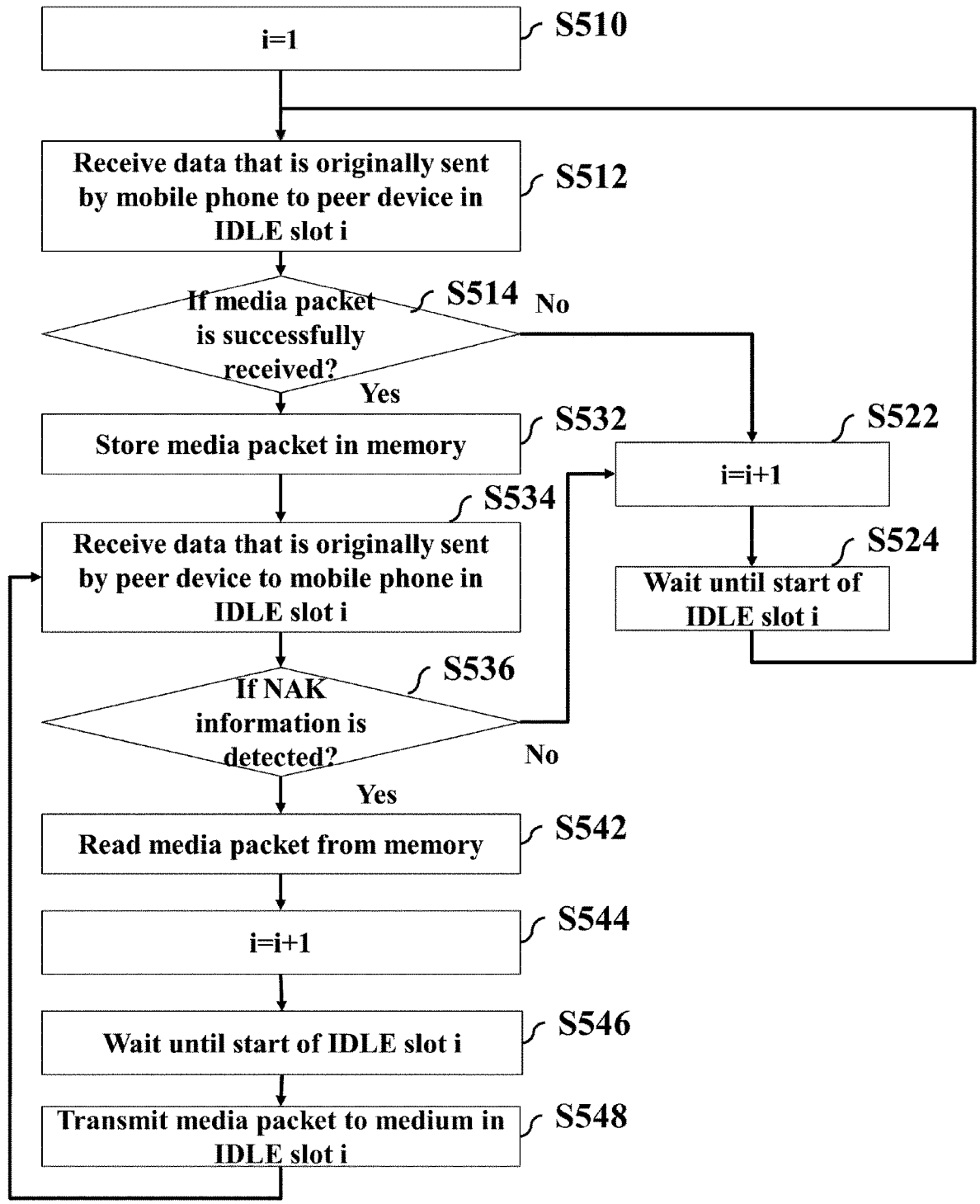
FIG. 5 is a flowchart of a method for retransmitting wireless peer packets in the LE-CIS according to an embodiment of the present invention.

Typically, the left wireless earbud 110 and the right wireless earbud 120 enter the sleep state in IDLE slots to save battery power consumption. But, in order to address the aforementioned problems, the left wireless earbud 110 and the right wireless earbud 120 each obtains the transmission schedule information of the peer device from the mobile phone 130 or the peer device. For example, in addition to the transmission schedule information of the left wireless earbud 110, the left wireless earbud 110 also obtains the transmission schedule information of the right wireless earbud 120 from the mobile phone 130 or the right wireless earbud 120, which enables the left wireless earbud 110 to accordingly receive the media packets that are originally sent by the mobile phone 130 to the right wireless earbud 120 in scheduled slots, and to accordingly retransmit the received media packets in other scheduled slots. An embodiment of the invention introduces a method for retransmitting wireless peer packets, which allows the left wireless earbud 110 and the right wireless earbud 120 not to go to sleep in IDLE slots (also referred to as peer-side RX/TX slots in the present invention). Instead, they continuously receive and temporarily store the media packets originally sent by the mobile phone 130 to the peer device, and receive and detect the response packets sent by the peer device. Once detecting that any response packet sent by the peer device includes NAK information, the left wireless earbud 110 or the right wireless earbud 120 transmits the corresponding media packet, which was previously received, to the medium. Since the mobile phone 130 transmits media packets to the peer device and the peer device transmits response packets to the mobile phone 130 while the left wireless earbud 110 or the right wireless earbud 120 is in IDLE slots, these IDLE slots may be referred to as a peer-side time period collectively. The method is performed when the processing unit 342 of the left wireless earbud 110 or the right wireless earbud 120 loads and executes relevant firmware and/or software codes. Refer to detailed steps shown in FIG. 5:

Step S510: The variable i is set to one. The variable i records the number of the IDLE slot to indicate the time point at which the RF module 320 is driven to receive or transmit data.

Step S512: Data that is originally sent by the mobile phone 130 to the peer device is received in the IDLE slot i. That is, the processing unit 342 may drive the RF module 320 and the MODEM 330 in the RX slot for the peer device to receive signal through the designated physical channel in the medium.

Step S514: It is determined whether a media packet is successfully received. If so, the process proceeds to step S532. Otherwise, the process proceeds to step S522. When the data received in the medium can pass the cyclic redundancy check (CRC), and a media packet that is originally sent by the mobile phone 130 to the peer device can be recognized by the decoded content, the processing unit 342 determines that a media packet is successfully received. The decoded content used for judgment may include data such as preamble, access address, link layer (LL) header, etc.

Step S522: The variable i is increased by one.

Step S524: Wait until the start of IDLE slot i (that is, the next IDLE slot after receiving data in step S512). It would be noted that, because the next subevent may include the TX slot and the RX slot for this wireless earbud, the next IDLE slot does not necessarily exist in the next subevent.

Step S532: The media packet is stored in the memory 344.

Step S534: Data that is originally sent by the peer device to the mobile phone 130 is received in the IDLE slot i. That is, the processing unit 342 may drive the RF module 320 and the MODEM 330 in the TX slot for the peer device to receive signal of the designated physical channel in the medium.

Step S536: It is determined whether NAK information is detected. If so, the process proceeds to step S542. Otherwise, the process proceeds to step S522. When the data received in the medium can pass the CRC, and a response packet that is originally sent by the peer device to the mobile phone 130 can be recognized by the decoded content, the processing unit 342 further determines whether NAK information is carried in the response packet. For example, the NESN in the response packet equals the SN in the media packet temporarily stored in the memory 344, it means that the response packet carries NAK information. The NAK information is used to activate the retransmission mechanism between the mobile phone 130 and the peer device.

Step S542: The media packet is read from the memory 344.

Step S544: The variable i is increased by one.

Step S546: Wait until the start of IDLE slot i (that is, the next IDLE slot after receiving data in step S534).

Step S548: The media packet is transmitted to the medium in the IDLE slot i.

Figure 6:
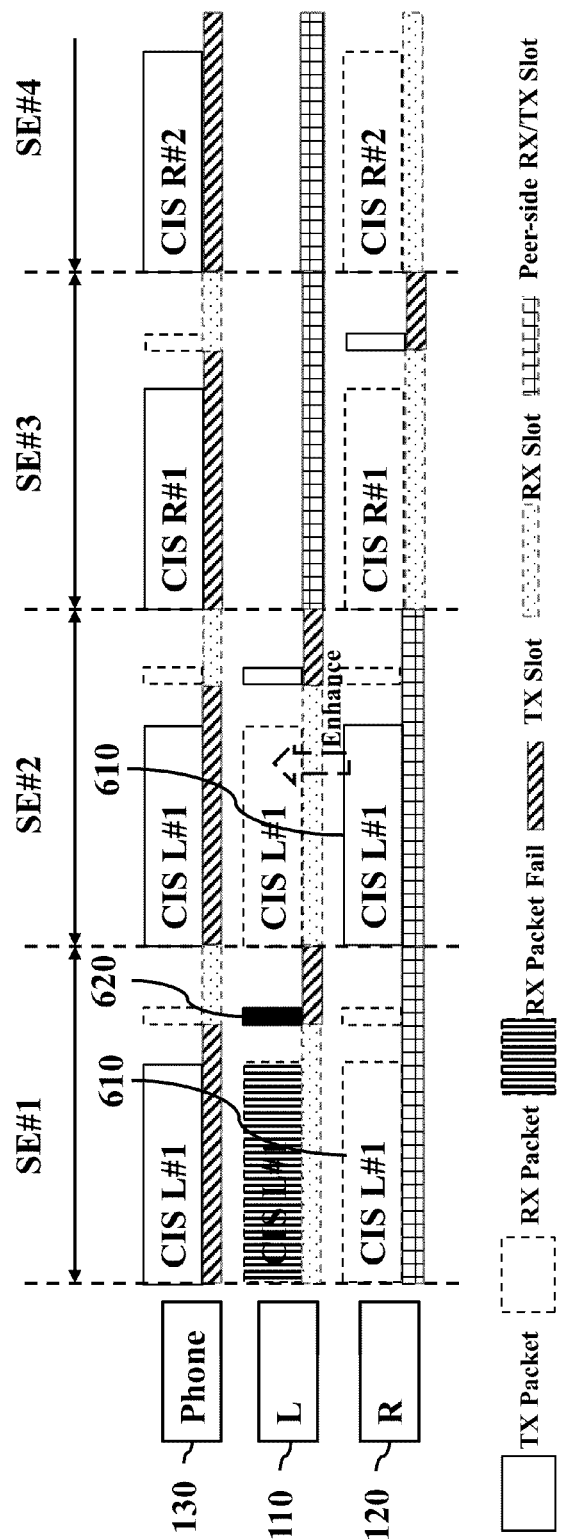
FIG. 6 shows a wireless transmission timing diagram for retransmitting media packets in the LE-CIS according to an embodiment of the present invention.

For example, refer to FIG. 6. The right wireless earbud 120 successfully receives the media packet 610 that is originally sent by the mobile phone 130 to the left wireless earbud 110 in the IDLE slot of the subevent SE #1 (the "Yes" paths of steps S512 and S514 in sequence) and stores the media packet 610 in the memory 344 (step S532). In the same IDLE slot, the right wireless earbud 120 subsequently detects NAK information in the response packet 620 that is originally sent by the left wireless earbud 110 to the mobile phone 130 (the "Yes" paths of steps S534 and S536 in sequence). The right wireless earbud 120 transmits the media packet 610 to the medium for enhancing signal in the IDLE slot of the subevent SE #2 (step S548), which is used to increase the opportunity of successfully receiving the retransmitted media packet 610 by the left wireless earbud 110.

In alternative embodiments of LE audio, the mobile phone 130 may establish a connectionless isochronous channel with the left wireless earbud 110 and the right wireless earbud 120, and the channel uses two LE Broadcast Isochronous Stream (LE-BIS) logical transports and supports uni-directional communication.

The two BISs form a broadcast isochronous group (BIG), and each BIS has multiple BIS instances. The BIS instances in the same BIG have common timing reference data, which is used in the synchronization of broadcast isochronous data processing by the left wireless earbud 110 and the right wireless earbud 120. Each BIS may be used by multiple wireless receivers. Each BIS instance has its unique access address and uses the designated channel map to transmit media packets. For each BIS, there exists a schedule of transmission time slots referred to as events and subevents.

Each event occurs with a regular ISO interval. Each event is divided into one or more subevents. Each subevent contains one TX slot. Taking the mobile phone 130 as an example, during each subevent in a BIS, the mobile phone 130 may transmit a media packet to the left wireless earbud 110 or the right wireless earbud 120 in a TX slot. In addition, the retransmission number (RTN) is set for each BIS. For example, when RTN=1, it means that each media packet will be retransmitted once.

The mobile phone 130 may arrange the media packet transmission between the mobile phone 130 and the left wireless earbud 110 and send the transmission schedule information to the left wireless earbud 110, thereby enabling the left wireless earbud 110 to receive packets in some given time slots (also called RX slots or reception time intervals). The remains that are not allocated for receiving packets are called idle slots. Similarly, the mobile phone 130 may arrange the media packet transmission between the mobile phone 130 and the right wireless earbud 120 and send the transmission schedule information to the right wireless earbud 120. The transmission schedule information includes the RTN setting.

Figure 7:
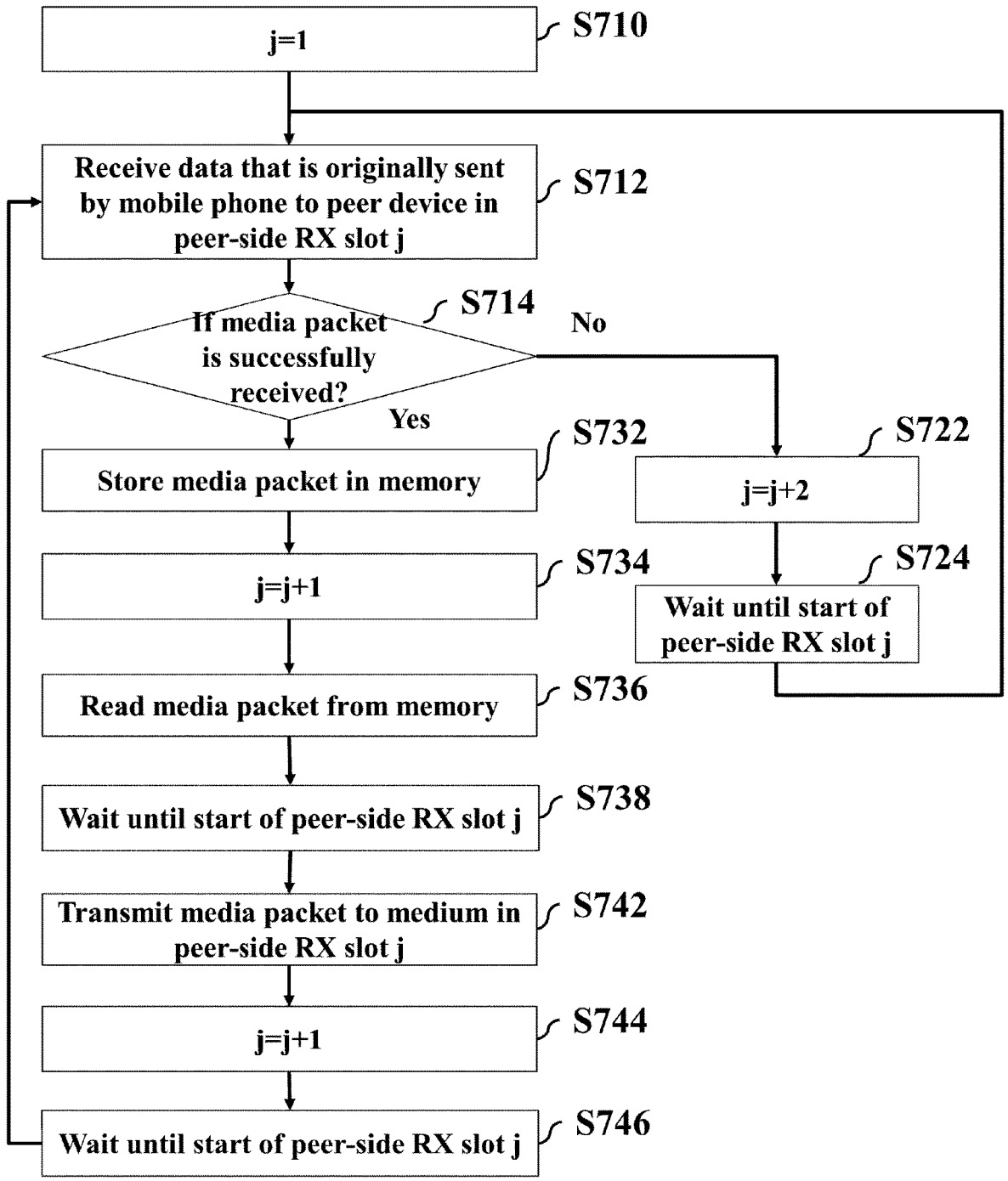
FIG. 7 is a flowchart of a method for retransmitting wireless peer packets in the Low Energy Broadcast Isochronous Stream (LE-BIS) according to an embodiment of the present invention.

For example, in an exemplary transmission between the mobile phone 130 and the left wireless earbud 110, the mobile phone 130 transmits BIS left-channel data L #1 to the left wireless earbud 110 in the subevent SE #1, and retransmits BIS left-channel data L #1 to the left wireless earbud 110 in the subevent SE #2. But for the right wireless earbud 120, the times slots in the subevents SE #1 and SE #2 are IDLE slots, which may also be referred to as peer-side reception slots. Subsequently, the mobile phone 130 transmits BIS right-channel data R #1 to the right wireless earbud 120 in the subevent SE #3, and retransmits BIS right-channel data R #1 to the right wireless earbud 120 in the subevent SE #4. Similarly, but for the left wireless earbud 110, the times slots in the subevents SE #3 and SE #4 are peer-side RX slots. Typically, the left wireless earbud 110 and the right wireless earbud 120 enter the sleep state in IDLE slots to save battery power consumption. But, in order to address the aforementioned problems, the left wireless earbud 110 and the right wireless earbud 120 each obtains the transmission schedule information of the peer device from the mobile phone 130 or the peer device. For example, in addition to the transmission schedule information of the left wireless earbud 110, the left wireless earbud 110 also obtains the transmission schedule information of the right wireless earbud 120 from the mobile phone 130 or the right wireless earbud 120, which enables the left wireless earbud 110 to accordingly receive the media packets that are originally sent by the mobile phone 130 to the right wireless earbud 120 in scheduled slots, and to accordingly retransmit the received media packets in other scheduled slots. An embodiment of the invention introduces a method for retransmitting wireless peer packets, which, in the case of RTN=1, allows the left wireless earbud 110 and the right wireless earbud 120 not to go to sleep in peer-side RX slots. Instead, they continuously receive and temporarily store the media packets originally sent by the mobile phone 130 to the peer device, and transmit the stored media packets to the medium. These peer-side RX slots may be referred to as a peer-side time period collectively. The method is performed when the processing unit 342 of the left wireless earbud 110 or the right wireless earbud 120 loads and executes relevant firmware and/or software codes. Refer to detailed steps shown in FIG. 7:

Step S710: The variable j is set to one. The variable j records the number of the peer-side RX slot to indicate the time point at which the RF module 320 is driven to receive data.

The technical details of steps S712 and S714 are similar to that of steps S512 and S514, respectively, and will not be repeated for the sake of brevity.

Step S722: The variable j is increased by two.

Step S724: Wait until the start of peer-side RX slot j (that is, the second peer-side RX slot after receiving data in step S712).

Step S732: The media packet is stored in the memory 344.

Step S734: The variable j is increased by one.

Step S736: The media packet is read from the memory 344.

Step S738: Wait until the start of peer-side slot j (that is, the next peer-side RX slot after receiving data in step S712).

Step S742: The media packet is transmitted to the medium in the peer-side slot j (that is, the next peer-side RX slot after receiving data in step S712).

Step S744: The variable j is increased by one.

Step S746: Wait until the start of peer-side RX slot j (that is, the second peer-side RX slot after receiving data in step S712).

Figure 8:
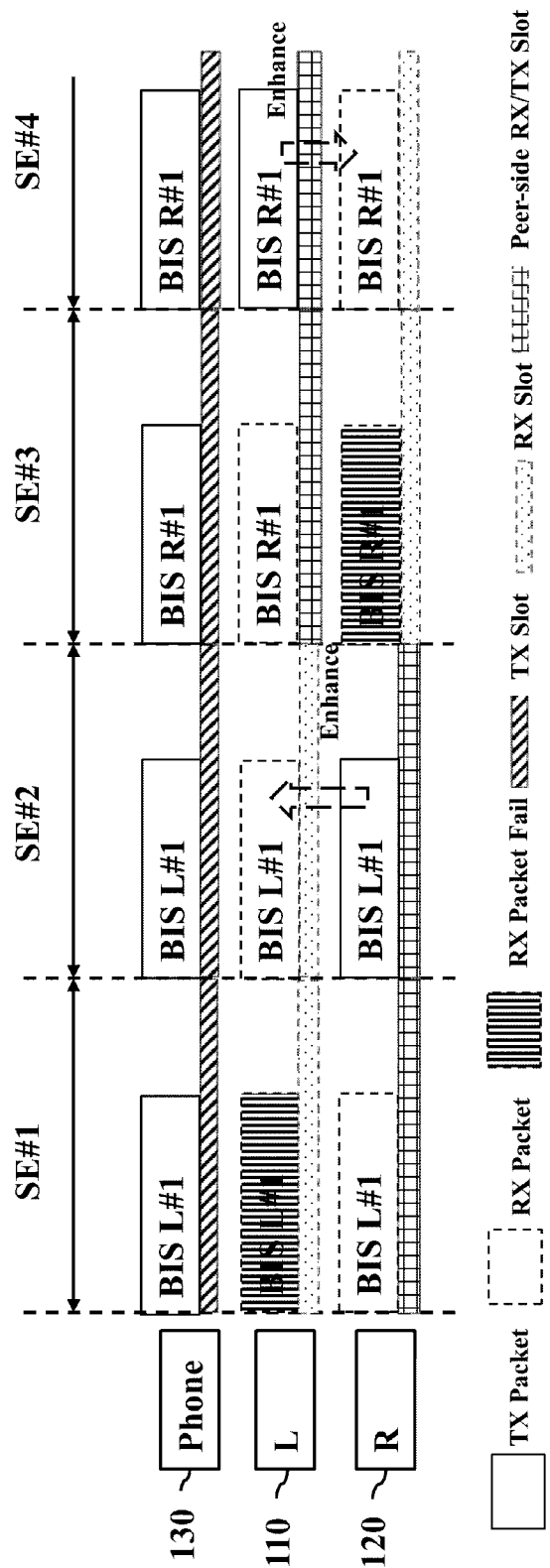
FIG. 8 shows a wireless transmission timing diagram for retransmitting media packets in the LE-BIS according to an embodiment of the present invention.

For example, refer to FIG. 8. The right wireless earbud 120 successfully receives the media packet that is originally sent by the mobile phone 130 to the left wireless earbud 110 in the peer-side RX slot of the subevent SE #1 (the "Yes" paths of steps S712 and S714 in sequence) and stores the media packet in the memory 344 (step S732). The right wireless earbud 120 transmits the media packet to the medium for enhancing signal in the peer-side RX slot of the subevent SE #2 (step S742), which is used to increase the opportunity of successfully receiving the retransmitted media packet by the left wireless earbud 110. Similarly, the left wireless earbud 110 successfully receives the media packet that is originally sent by the mobile phone 130 to the right wireless earbud 120 in the peer-side RX slot of the subevent SE #3 (the "Yes" paths of steps S712 and S714 in sequence) and stores the media packet in the memory 344 (step S732). The left wireless earbud 110 transmits the media packet to the medium for enhancing signal in the peer-side RX slot of the subevent SE #4 (step S742), which is used to increase the opportunity of successfully receiving the retransmitted media packet by the right wireless earbud 120.

Figure 10:
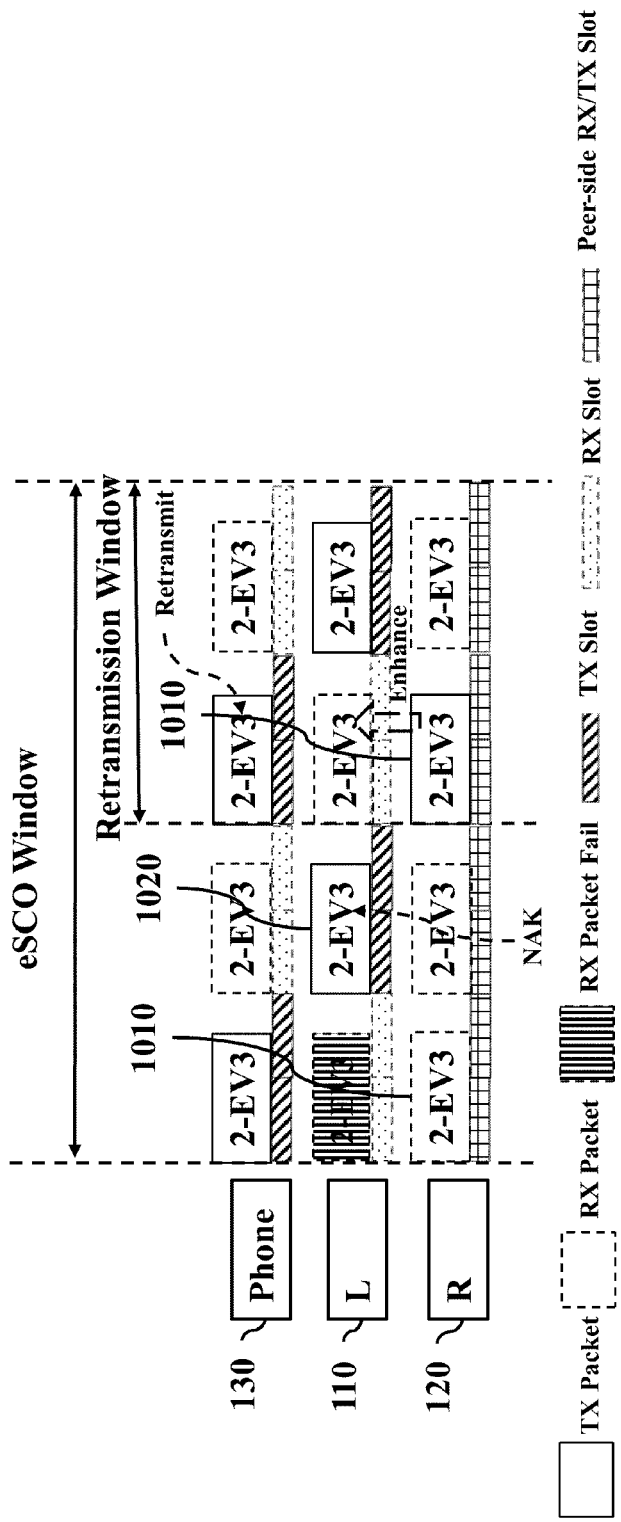
FIG. 10 shows a wireless transmission timing diagram for retransmitting media packets in the eSCO link according to an embodiment of the present invention.

In some embodiments of eSCO, refer to FIG. 10, the mobile phone 130 may establishes eSCO links with the left wireless earbud 110 and the right wireless earbud 120. The eSCO link is a symmetric, point-to-point link between the mobile phone 130 and the left wireless earbud 110 or the right wireless earbud 120. One of the connected left wireless earbud 110 and right wireless earbud 120 may be called as an agent device, and the other may be called as a partner device. The mobile phone 130 maintains the eSCO link by using reserved slots at regular intervals. The mobile phone 130 sends packets at regular intervals depending on packet type used for transmission, for example, 2 to 8 slots in every 12 time slots for 2-EV3 packets, where each slot is 625 µs typically. The eSCO link provides a limited number of retransmissions. For a detailed example, the mobile phone 130 may transmit a 2-EV3 packet (which may be referred to as a media packet) carrying mono data to the agent device in the first time slot. The agent device transmits a 2-EV3 packet or a Null Packet (which may be referred to as a response packet) carrying ACK or NAK information to the mobile phone 130 in the second time slot. When receiving NAK information from the agent device, the mobile phone 130 retransmits the media packet to the agent device in the third time slot. The first to fourth time slots may be referred to as an eSCO window, in which the third to fourth time slots may be referred to as a retransmission window.

Figure 9:
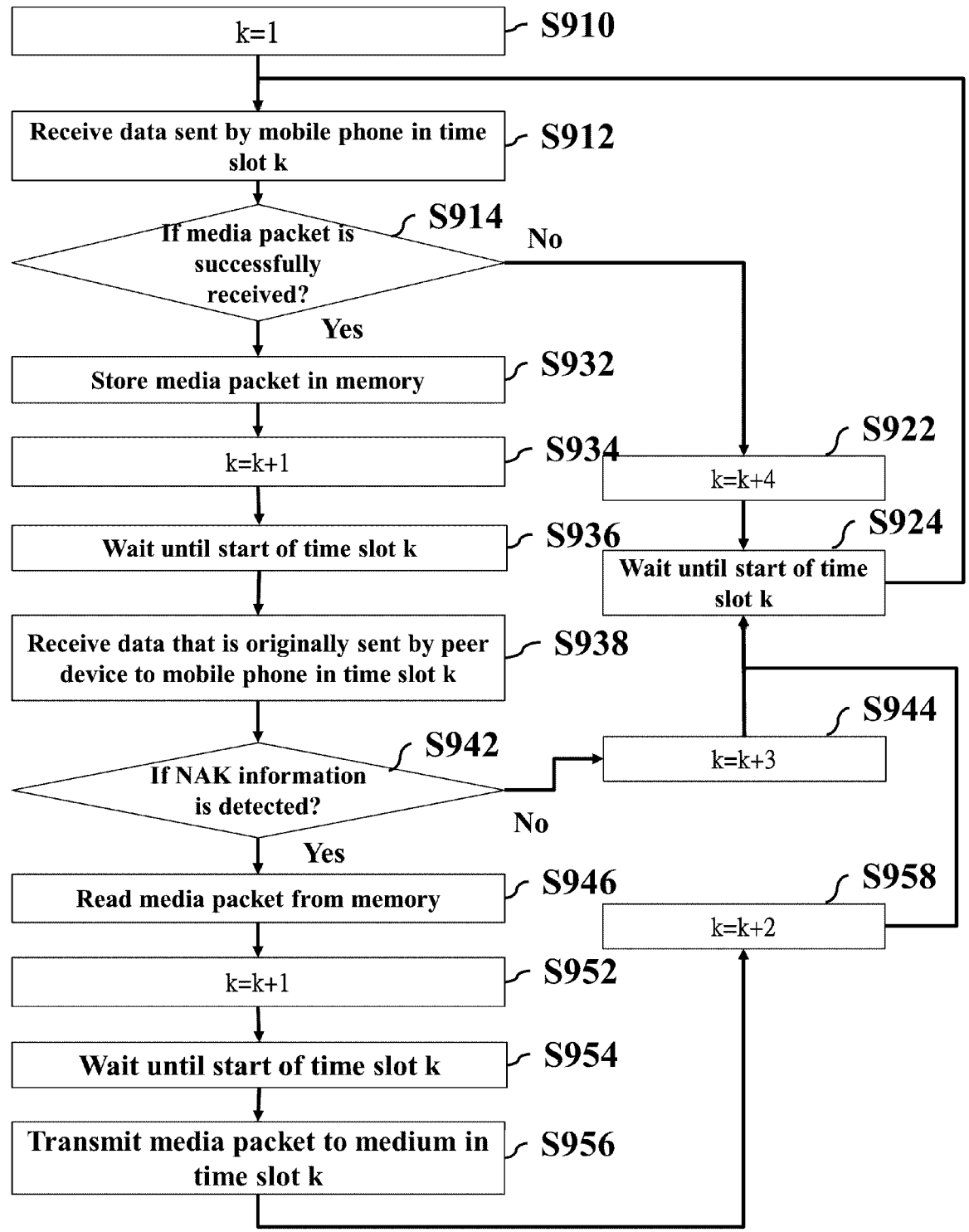
FIG. 9 is a flowchart of a method for retransmitting wireless peer packets in the extended Synchronous Connection-Oriented (eSCO) link according to an embodiment of the present invention.

For example, in an exemplary transmission between the mobile phone 130 and the left wireless earbud 110 (as the agent device shown in FIG. 10), the mobile phone 130 transmits mono data to the left wireless earbud 110 in four time slots of one eSCO window. Since the mobile phone 130 does not establish an eSCO link with the right wireless earbud 120, the right wireless earbud 120 enters a sleep state to save battery power consumption. Therefore, for the right wireless earbud 120, the four time slots in this eSCO window include two pairs of peer-side RX slots and peer-side TX slots. In general, these four time slots may be collectively referred to as a peer-side time period. However, in order to address the aforementioned problems, the right wireless earbud 120 (i.e. a wireless earbud that has not established an eSCO link with the mobile phone 130) can be employed as a monitoring device, and the monitoring device receives parameters about the eSCO link from the mobile phone 130 or the agent device. An embodiment of the invention introduces a method for retransmitting wireless peer packets, which allows the monitoring device not to go to sleep in the peer-side time period. Instead, the monitoring device continuously receives and temporarily stores the media packets originally sent by the mobile phone 130 to the peer device, and receives and detects the response packets sent by the peer device. Once detecting that any response packet sent by the peer device includes NAK information, the monitoring device transmits the corresponding media packet, which is previously received, to the medium. The method is performed when the processing unit 342 of the monitoring device loads and executes relevant firmware and/or software codes. Refer to detailed steps shown in FIG. 9:

Step S910: The variable k is set to one. The variable k records the number of the time slot to indicate the time point at which the RF module 320 is driven to receive or transmit data.

Step S912: Data that is originally sent by the mobile phone 130 to the agent device is received in the time slot k (i.e. the first time slot in one eSCO window).

Step S914: It is determined whether a media packet is successfully received. If so, the process proceeds to step S932. Otherwise, the process proceeds to step S922. When the data received in the medium can pass the CRC, and a media packet that is originally sent by the mobile phone 130 to the peer device can be recognized by the decoded content, the processing unit 342 determines that a media packet is successfully received.

Step S922: The variable k is increased by four (which is used to indicate the first time slot in the next eSCO window).

Step S924: Wait until the start of time slot k (that is, the first time slot in the next eSCO window).

Step S932: The media packet is stored in the memory 344.

Step S934: The variable k is increased by one (which is used to indicate the second time slot in this eSCO window, also referred to as a peer-side TX slot).

Step S936: Wait until the start of time slot k (that is, the second time slot in this eSCO window, also referred to as a peer-side TX slot).

Step S938: Data that is originally sent by the peer device to the mobile phone 130 is received in the time slot k (that is, the second time slot in this eSCO window, also referred to as a peer-side TX slot).

Step S942: It is determined whether NAK information is detected. If so, the process proceeds to step S946. Otherwise, the process proceeds to step S944. When a response packet that is originally sent by the peer device to the mobile phone 130 can be recognized, the processing unit 342 further determines whether NAK information is carried in the response packet.

Step S944: The variable k is increased by three (which is used to indicate the first time slot in the next eSCO window).

Step S946: The media packet is read from the memory 344.

Step S952: The variable k is increased by one (which is used to indicate the third time slot in this eSCO window, also referred to as a peer-side RX slot).

Step S954: Wait until the start of time slot k (that is, the third time slot in this eSCO window, also referred to as a peer-side RX slot).

Step S956: The media packet is transmitted to the medium in the time slot k (that is, the third time slot in this eSCO window, also referred to as a peer-side RX slot).

Step S958: The variable k is increased by two.

For example, refer to FIG. 10. The right wireless earbud 120 operates as the monitoring device to successfully receive the media packet 1010 that is originally sent by the mobile phone 130 to the left wireless earbud 110 in the first time slot of the eSCO window (the "Yes" paths of steps S912 and S914 in sequence) and store the media packet 1010 in the memory 344 (step S932). In the second time slot of the eSCO window, the right wireless earbud 120 subsequently detects NAK information in the response packet 1020 that is originally sent by the left wireless earbud 110 to the mobile phone 130 (the "Yes" paths of steps S938 and S942 in sequence). The right wireless earbud 120 transmits the media packet 1010 to the medium for enhancing signal in the third time slot of the eSCO window (step S956), which is used to increase the opportunity of successfully receiving the retransmitted media packet 1010 by the left wireless earbud 110.

Figure 11:
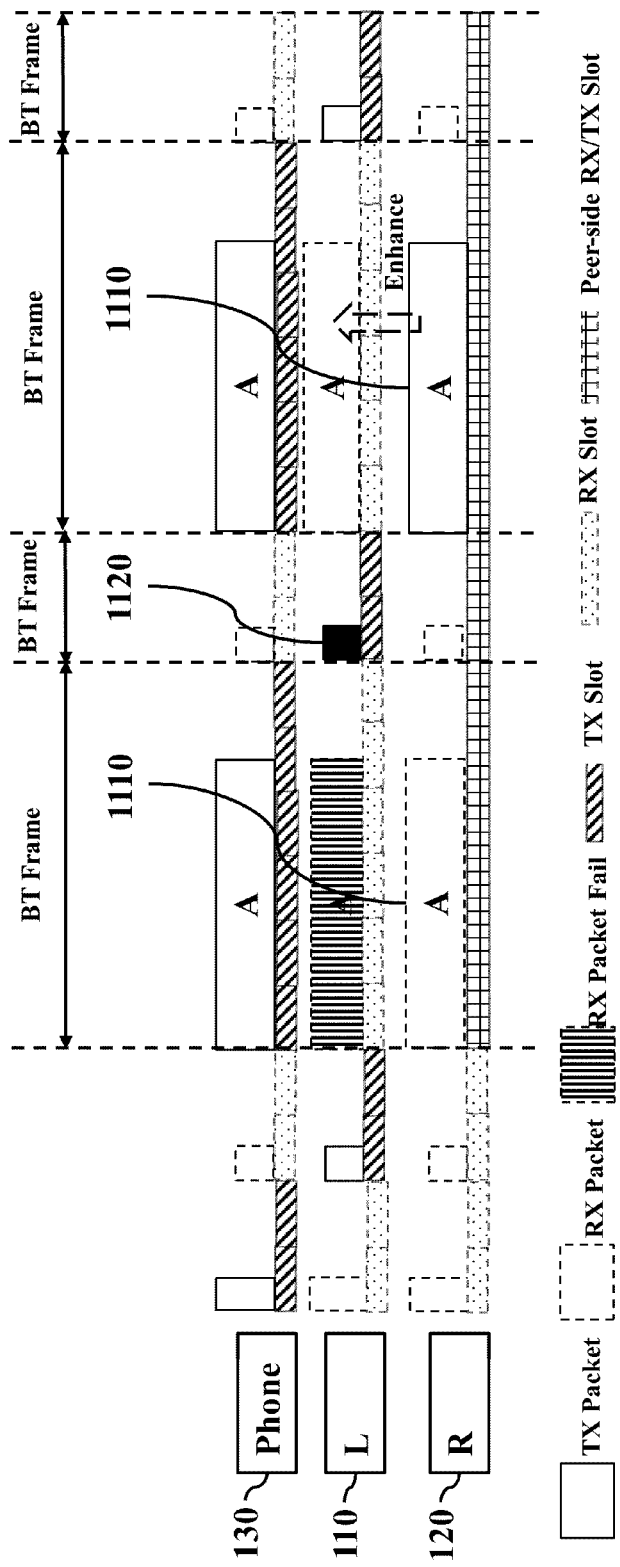
FIG. 11 shows a wireless transmission timing diagram for retransmitting media packets in the Advanced Audio Distribution Profile (A2DP) of the Asynchronous Connection-Less (ACL) channel according to an embodiment of the present invention.

The aforementioned method for retransmitting wireless peer packets can be applied to the Advanced Audio Distribution Profile (A2DP) of the ACL channel. For example, refer to FIG. 11, the mobile phone 130 establishes ACL links with the left wireless earbud 110 and the right wireless earbud 120. The right wireless earbud 120 successfully receives the media packet 1110 that is originally sent by the mobile phone 130 to the left wireless earbud 110 in the time slot of one Bluetooth frame (also referred to as a peer-side RX slot) and stores the media packet 1110 in the memory 344. In the time slot of the next Bluetooth frame (also referred to as a peer-side TX slot), the right wireless earbud 120 subsequently detects NAK information in the response packet 1120 that is originally sent by the left wireless earbud 110 to the mobile phone 130. The right wireless earbud 120 transmits the media packet 1110 to the medium for enhancing signal in the time slot of the next Bluetooth frame, which is used to increase the opportunity of successfully receiving the retransmitted media packet 1110 by the left wireless earbud 110. The formats of the media packet 1110 and the response packet 1120 conform to the Bluetooth specification. The peer-side RX and TX slots are collectively referred to as a peer-side time period.

Although the aforementioned embodiments describe the network formed by the mobile phone 130 (also called the wireless master device), the left wireless earbud 110 and the right wireless earbud 120 (also called the wireless slave devices), but this is only for illustration and not for limiting the present invention. Those artisans may realize the method for retransmitting wireless peer packets of the present invention to a wireless audio network or other similar networks. The wireless audio network may include one wireless master device and at least two wireless slave devices. The wireless master device may be, for example, a personal computer, a laptop PC, a tablet computer, a mobile phone, or other electronic products, and the wireless slave devices may include, for example, a left speaker and a right speaker each containing a Bluetooth transmission module.

Some or all of the aforementioned embodiments of the method of the invention may be implemented in a computer program, such as a driver of a dedicated hardware, digital signal processor (DSP) code in a specific programming language, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIG. 3, it should be noted that additional elements may be included to achieve better performance without departing from the spirit of the invention. Each element of FIG. 3 is composed of various circuits and arranged to operably perform the aforementioned operations. While the process flows described in FIGS. 5, 7 and 9 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for retransmitting wireless peer packets, performed by a processing unit of a first wireless slave device, comprising:

receiving a media packet that is originally sent by a wireless master device to a second wireless slave device in a peer-side time period; and transmitting the media packet in a medium in the peer-side time period to relay the media packet originated by the wireless master device to the second wireless slave device while a retransmission mechanism is activated between the wireless master device and the second wireless slave device for retransmitting, by the wireless master device, the media packet in the medium in a transmission slot that is overlapping with the peer-side time period, wherein the wireless master device and the first wireless slave device transmit the same media packet in the medium in the same time period, the wireless master device is a source device for the media packet, and the first wireless slave device is operated as an overlapping-relay device between the wireless master device and the second wireless slave device for the media packet, wherein the first wireless slave device and the second wireless slave device are mutually peer devices, wherein the peer-side time period indicates a time period that is originally used by the second wireless slave device communicating with the wireless master device.

2. The method of claim 1, comprising:
receiving a response packet that is originally sent by the second wireless slave device to the wireless master device in the peer-side time period, wherein the response packet carries negative-acknowledgement information for activating the retransmission mechanism to retransmit the media packet.

3. The method of claim 2, comprising:
determining that the response packet carries the negative-acknowledgement information when a next expected sequence number in the response packet is equal to a sequence number in the media packet.

4. The method of claim 2, wherein a logical transport of a first connected isochronous stream is used between the wireless master device and the first wireless slave device, a logical transport of a second connected isochronous stream is used between the wireless master device and the second wireless slave device, and the first connected isochronous stream and the second connected isochronous stream form a connected isochronous group.

5. The method of claim 2, wherein the wireless master device establishes an extended synchronous connection-oriented link with the first wireless slave device and the second wireless slave device, the media packet is a 2-EV3 packet, and the response packet is a 2-EV3 packet or a Null Packet.

6. The method of claim 2, wherein the wireless master device establishes an asynchronous connection-less link with the first wireless slave device and the second wireless slave device, and the media packet and the response packet conform to advanced audio distribution profile specification.

7. The method of claim 1, wherein a logical transport of a broadcast isochronous stream is used between the wireless master device and the first wireless slave device, and between the wireless master device and the second wireless slave device, and a retransmission number of the broadcast isochronous stream is set to 1 or greater.

8. A non-transitory computer-readable storage medium for retransmitting wireless peer packets when loaded and executed by a processing unit of a first wireless slave device, the non-transitory computer-readable storage medium comprising program code to:
receive a media packet that is originally sent by a wireless master device to a second wireless slave device in a peer-side time period; and
transmit the media packet in a medium in the peer-side time period to relay the media packet originated by the wireless master device to the second wireless slave device while a retransmission mechanism is activated between the wireless master device and the second wireless slave device for retransmitting, by the wireless master device, the media packet in the medium in a transmission slot that is overlapping with the peer-side time period, wherein the wireless master device and the first wireless slave device transmit the same media packet in the medium in the same time period, the wireless master device is a source device for the media packet, and the first wireless slave device is operated as an overlapping-relay device between the wireless master device and the second wireless slave device for the media packet, wherein the first wireless slave device and the second wireless slave device are mutually peer devices, wherein the peer-side time period indicates a time period that is originally used by the second wireless slave device communicating with the wireless master device.

9. The non-transitory computer-readable storage medium of claim 8, comprising program code to:
receive a response packet that is originally sent by the second wireless slave device to the wireless master device in the peer-side time period, wherein the response packet carries negative-acknowledgement information for activating the retransmission mechanism to retransmit the media packet.

10. The non-transitory computer-readable storage medium of claim 9, wherein a logical transport of a first connected isochronous stream is used between the wireless master device and the first wireless slave device, a logical transport of a second connected isochronous stream is used between the wireless master device and the second wireless slave device, and the first connected isochronous stream and the second connected isochronous stream form a connected isochronous group.

11. The non-transitory computer-readable storage medium of claim 9, wherein the wireless master device establishes an extended synchronous connection-oriented link with the first wireless slave device and the second wireless slave device, the media packet is a 2-EV3 packet, and the response packet is a 2-EV3 packet or a Null Packet.

12. The non-transitory computer-readable storage medium of claim 9, wherein the wireless master device establishes an asynchronous connection-less link with the first wireless slave device and the second wireless slave device, and the media packet and the response packet conform to advanced audio distribution profile specification.

13. The non-transitory computer-readable storage medium of claim 8, wherein a logical transport of a broadcast isochronous stream is used between the wireless master device and the first wireless slave device, and between the wireless master device and the second wireless slave device, and a retransmission number of the broadcast isochronous stream is set to 1 or greater.

14. An apparatus for retransmitting wireless peer packets, installed in a first wireless slave device, comprising:
a processing unit, arranged to receive a media packet that is originally sent by a wireless master device to a second wireless slave device through a radio frequency module in a peer-side time period; and transmit the media packet in a medium through the radio frequency module in the peer-side time period to relay the media packet originated by the wireless master device to the second wireless slave device while a retransmission mechanism is activated between the wireless master device and the second wireless slave device for retransmitting, by the wireless master device, the media packet in the medium in a transmission slot that is overlapping with the peer-side time period, wherein the wireless master device and the first wireless slave device transmit the same media packet in the medium in the same time period, the wireless master device is a source device for the media packet, and the first wireless slave device is operated as an overlapping-relay device between the wireless master device and the second wireless slave device for the media packet, wherein the first wireless slave device and the second wireless slave device are mutually peer devices, wherein the peer-side time period indicates a time period that is originally used by the second wireless slave device communicating with the wireless master device.

15. The apparatus of claim 14, wherein the processing unit is arranged to receive a response packet that is originally sent by the second wireless slave device to the wireless master device through the radio frequency module in the peer-side time period, wherein the response packet carries negative-acknowledgement information for activating the retransmission mechanism to retransmit the media packet.

16. The apparatus of claim 15, wherein the processing unit is arranged to determine that the response packet carries the negative-acknowledgement information when a next expected sequence number in the response packet is equal to a sequence number in the media packet.

17. The apparatus of claim 15, wherein a logical transport of a first connected isochronous stream is used between the wireless master device and the first wireless slave device, a logical transport of a second connected isochronous stream is used between the wireless master device and the second wireless slave device, and the first connected isochronous stream and the second connected isochronous stream form a connected isochronous group.

18. The apparatus of claim 15, wherein the wireless master device establishes an extended synchronous connection-oriented link with the first wireless slave device and the second wireless slave device, the media packet is a 2-EV3 packet, and the response packet is a 2-EV3 packet or a Null Packet.

19. The apparatus of claim 15, wherein the wireless master device establishes an asynchronous connection-less link with the first wireless slave device and the second wireless slave device, and the media packet and the response packet conform to advanced audio distribution profile specification.

20. The apparatus of claim 14, wherein a logical transport of a broadcast isochronous stream is used between the wireless master device and the first wireless slave device, and between the wireless master device and the second wireless slave device, and a retransmission number of the broadcast isochronous stream is set to 1 or greater.

* * * * *